US012573739B2

(12) United States Patent

Faircloth et al.

(10) Patent No.: US 12,573,739 B2
(45) Date of Patent: Mar. 10, 2026

(54) THERMAL PROTECTION SYSTEM INTEGRATED ANTENNA

(71) Applicants: Daniel Faircloth, Huntsville, AL (US); Griffin Gothard, Satellite Beach, FL (US)

(72) Inventors: Daniel Faircloth, Huntsville, AL (US); Griffin Gothard, Satellite Beach, FL (US)

( * ) Notice: Subject to any disclaimer, the term of this patent is extended or adjusted under 35 U.S.C. 154(b) by 64 days.

(21) Appl. No.: 18/614,802

(22) Filed: Mar. 25, 2024

(65) Prior Publication Data

US 2025/0087866 A1 Mar. 13, 2025

Related U.S. Application Data

(60) Provisional application No. 63/537,572, filed on Sep. 11, 2023.

(51) Int. Cl.

| | |
|---|---|
| ***H01Q 1/02*** | (2006.01) |
| ***H01Q 1/00*** | (2006.01) |
| ***H01Q 1/27*** | (2006.01) |
| ***H01Q 1/42*** | (2006.01) |

(52) U.S. Cl.

CPC ............... *H01Q 1/002* (2013.01); *H01Q 1/27* (2013.01); *H01Q 1/42* (2013.01)

(58) Field of Classification Search

CPC ............ H01Q 1/02; H01Q 1/002; H01Q 1/27; H01Q 1/28; H01Q 1/36; H01Q 1/42; H01Q 1/286; H01Q 13/00; H01Q 21/064

See application file for complete search history.

(56) References Cited

U.S. PATENT DOCUMENTS

| | | | | |
|---|---|---|---|---|
| 5,039,992 | A | 8/1991 | Lenormand et al. | |
| 8,378,904 | B1 * | 2/2013 | Colich | H01Q 1/02 343/705 |
| 9,972,907 | B2 * | 5/2018 | Stratis | H01Q 21/28 |
| 12,009,568 | B1 * | 6/2024 | Quarfoth | H01Q 1/02 |
| 2020/0112104 | A1 * | 4/2020 | Bieti | H01Q 13/06 |
| 2023/0019034 | A1 * | 1/2023 | Caldelas, II | H01Q 1/28 |
| 2023/0192300 | A1 | 6/2023 | DiVerde | |

* cited by examiner

*Primary Examiner* — Tung X Le

(74) *Attorney, Agent, or Firm* — Lanier Ford Shaver & Payne, P.C.; Gerald M. Walsh

(57) ABSTRACT

A thermal protection system integrated antenna providing a thermal protection system, a wave guide formed in the thermal protection system, and a coupling structure, wherein the coupling structure is connected to an antenna and feed structure. The thermal protection system is mounted on a platform skin of a vehicle and a portion of the thermal protection system is removed and replaced with filler material which has radio frequency transparency. A plurality of wave guides forms a phased array in the platform skin with either active or passive steering or a fixed beam. An internal waveguide path is constructed to route signals internally within the thermal protection system and through one or more apertures in a surface of the thermal protection system. The survivability of the overall antenna system is improved by the improved thermal shielding.

13 Claims, 6 Drawing Sheets

THERMAL PROTECTION SYSTEM INTEGRATED ANTENNA

CROSS-REFERENCE TO RELATED APPLICATIONS

This application claims priority to U.S. Provisional Application No. 63/537,572, filed Sep. 11, 2023, which is hereby incorporated herein by reference.

FIELD OF THE DISCLOSURE

This disclosure relates to thermal protection systems (TPS) that protect a vehicle against the extreme temperatures experienced in flight and, more particularly, to a TPS that is part of the antenna structure.

BACKGROUND OF THE DISCLOSURE

Spacecraft and military systems that fly at high speed and/or reenter the atmosphere include a thermal protection system (TPS) that protects the vehicle against the extreme temperatures experienced in flight. TPSs come in a variety of material compositions, perhaps the most famous of which are the carbon-carbon (C—C) variants used on the bottom of the NASA Space Shuttle and being developed for military and commercial hypersonic vehicles. Another popular material is carbon fiber reinforced silicon carbide (C—SiC).

Both C—C and C—SiC, while functioning well as TPS materials enabling vehicle survival through harsh aerothermal environments, are opaque to radio frequencies (RF). The harsh environment significantly complicates antenna design, and use of RF opaque TPS materials severely limits antenna placement options. Historically, two approaches have been used to attempt to mitigate these issues. In the first approach, system designers position the antennas on part of the vehicle experiencing lower temperatures and employ radome materials that can withstand the lesser environment. For hypersonic vehicles, this may limit antenna placement to the back or leeward sides, which further limits the types of antennas that can be used and may require the vehicle to fly along sub-optimal trajectories to support periodically closing a communications link. This solution has obvious and substantial limitations for future vehicle designers since in the former case whole classes of antenna missions cannot be considered (e.g., radar altimeter, seeker, synthetic aperture radar). In the latter case, a vehicle's total available flight energy comes at a premium, and maneuvering for the purposes of closing link substantially limits flight range and kinematics. Depending on the TPS design, there may be limitations of flight maneuvers due to survivability that take precedence over communications. In the second approach, materials engineering scientists attempt to design a material that has favorable RF properties while matching, to the extent required, the thermo-mechanical properties of the surrounding TPS material.

FIG. 1 and FIG. 2 show two typical antenna configurations in which an electrically large radome (or window) material provides environmental protection to the antenna. FIG. 1 shows a typical antenna structure 10 having radiating elements 11 mounted near a radome material 12 cut into a TPS platform 13 mounted on platform skin 14 of a vehicle. FIG. 2 shows a typical missile-like structure in which an antenna structure 10 is protected by a forward-facing radome 12. If a materials engineering process can yield a material with favorable RF properties, then the antenna design can proceed along a typical path for configurations such as these. However, designing new materials meeting these requirements is extremely difficult. What is needed is a thermal protection system integrated antenna (TPSIA).

SUMMARY OF THE DISCLOSURE

This disclosure describes an exemplary thermal protection system integrated antenna (TPSIA) having a thermal protection system, a wave guide formed in the thermal protection system, and a coupling structure wherein the coupling structure is connected to an antenna and feed structure. The thermal protection system is mounted on a platform skin of a vehicle. A portion of the thermal protection system is removed and replaced with filler material which has radio frequency transparency. The radio frequency energy is coupled into the wave guide via the coupling structure. The antenna and feed structure are integrated into the platform skin of a vehicle. A plurality of wave guides forms a phased array in the platform skin with either active or passive steering or a fixed beam. An internal waveguide path is constructed to route signals internally within the thermal protection system and through one or more apertures in a surface of the thermal protection system.

An advantage of the TPSIA of this disclosure over current systems using antennas with vehicles having TPSs is the elimination of the need to identify antenna window or radome materials that have proper structural and thermal properties such that the window is large enough to admit a standard antenna design.

Another advantage is a reduced volume required compared to a traditional antenna approach since standard antennas will almost certainly require spacing between a window and the radiating elements.

Another advantage is a tightly coupled TPSIA to the TPS, requiring less volume compared to a radome.

Another advantage is improved survivability of the overall antenna system by improving thermal shielding relative to a traditional design.

Another advantage is the ability to integrate the TPSIA with impedance tuning features (such as an environmentally adaptive antenna) to allow a single element or an entire array to dynamically adjust to harsh, changing environmental conditions.

DETAILED DESCRIPTION OF THE DISCLOSURE

Rather than limiting systems designers on antenna placement and requiring extremely challenging materials solutions for electrically large windows, a TPSIA of this disclosure alleviates these burdens in several ways. First, the TPSIA is tightly integrated with the conductive (i.e., RF opaque) TPS. Rather than attempt to remove the TPS from the vicinity of a traditional antenna design, the TPSIA leverages the conductive nature of the TPS and makes the TPS part of the antenna structure. By doing so, the region in which a TPS aperture must be made RF transparent is significantly smaller, which broadens the range of viable materials suitable for integration into the antenna. Further, this smaller aperture increases the survivability of the antenna and materials with a simplified integration into the platform skin of a vehicle.

Figure 1:
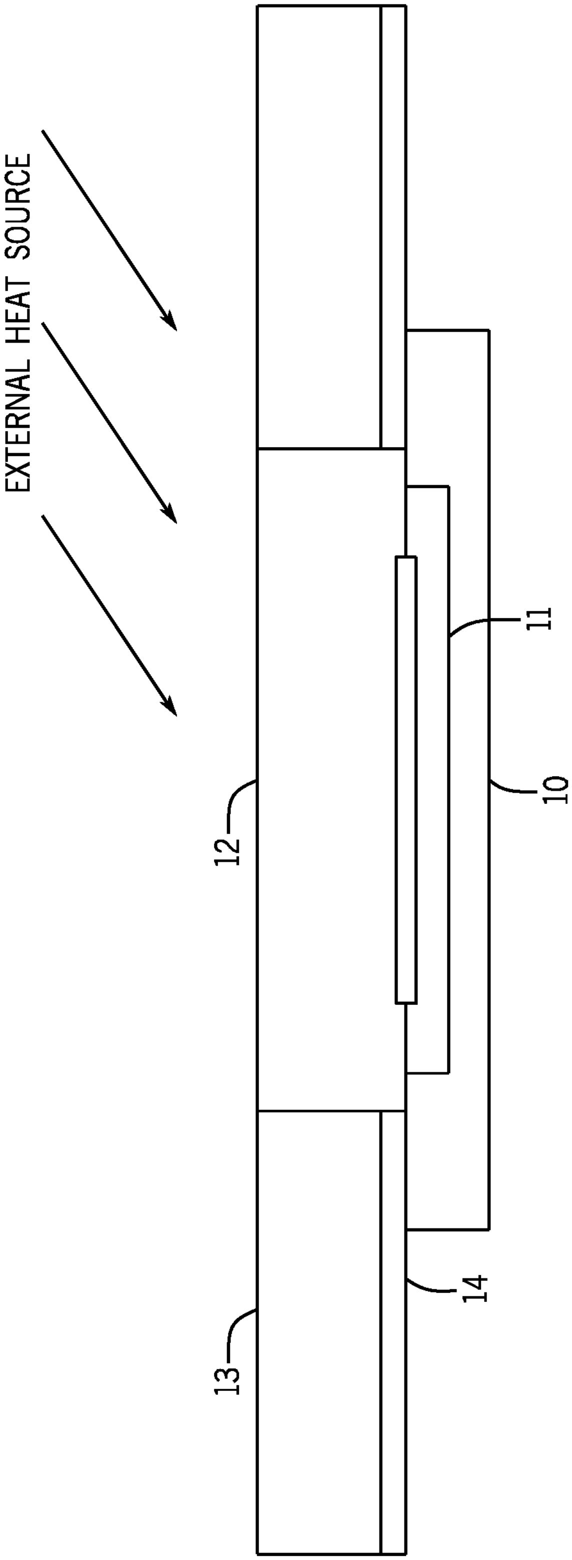
FIG. 1 PRIOR ART
FIG. 1 shows a typical antenna structure mounted near a radome material cut into a TPS.
Figure 2:
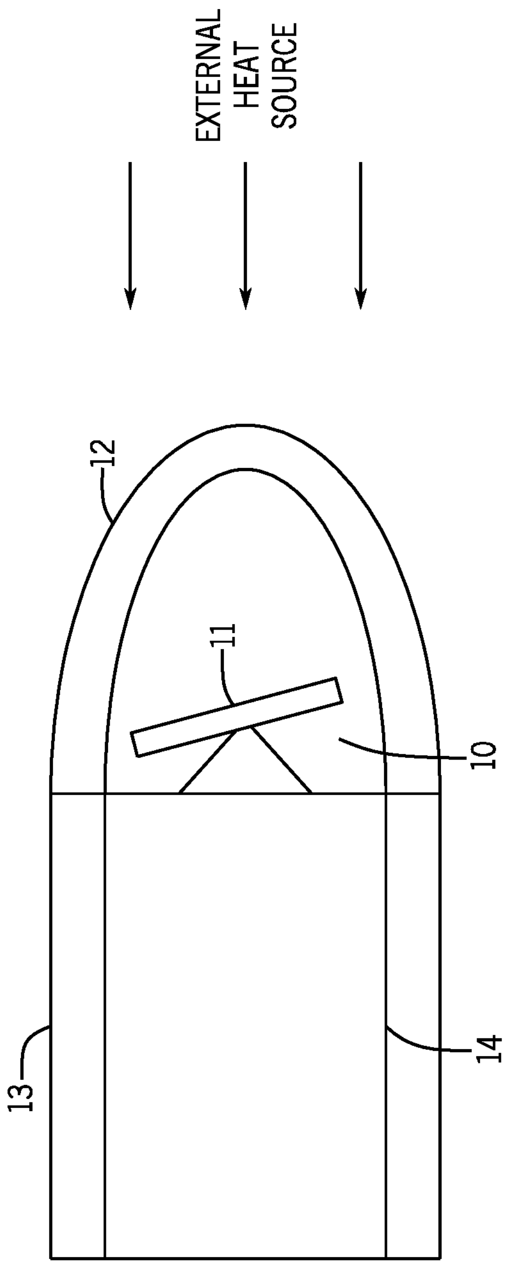
FIG. 2 PRIOR ART
FIG. 2 shows a typical missile-like structure in which an antenna structure is protected by a forward-facing radome.
Figure 3B:
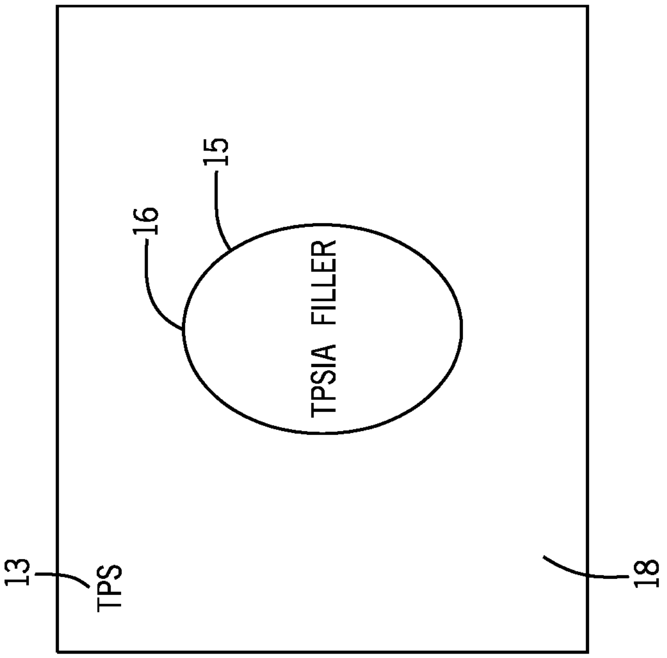
FIG. 3B shows a top view of the TPSIA waveguide having a circular configuration.
Figure 3A:
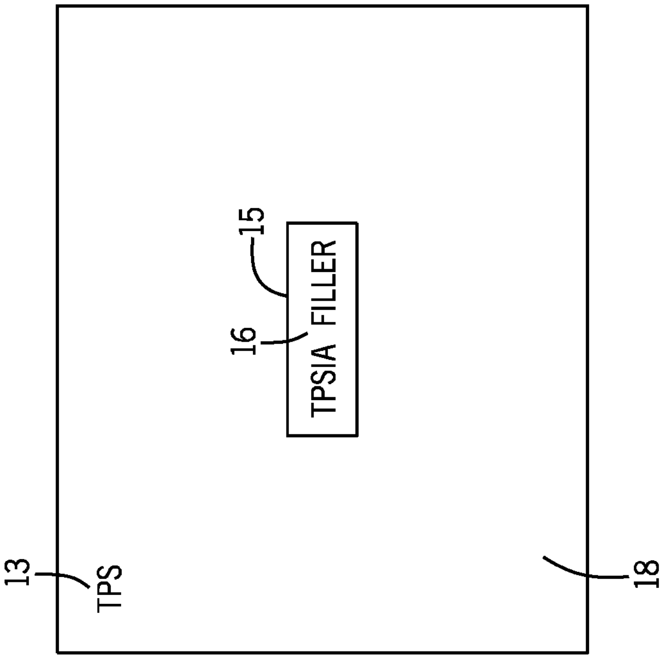
FIG. 3A shows a top view of a TPSIA waveguide of this disclosure having a rectangular configuration.
Figure 4:
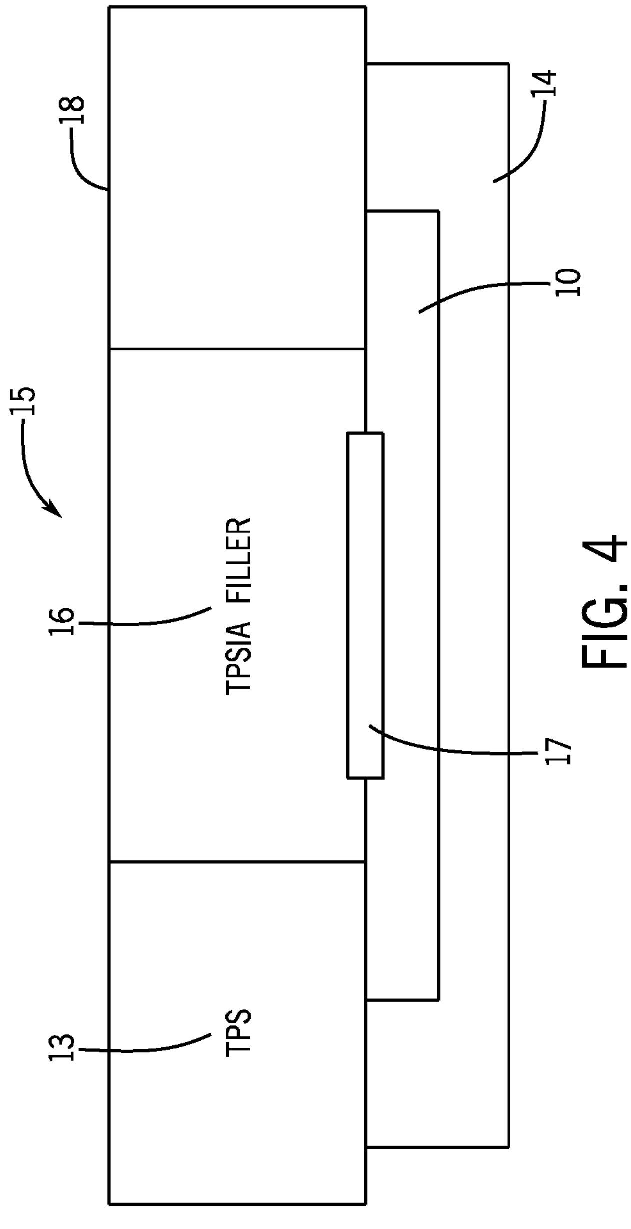
FIG. 4 shows a side view of the TPSIA waveguide.

FIG. 3A shows a top view of a thermal protection system integrated antenna (TPSIA) of this disclosure having a rectangular configuration and FIG. 3B shows a top view of the TPSIA having a circular configuration. FIG. 4 shows a side view of the TPSIA. Within the TPS 13, there is a shaped region forming a wave guide 15 in which the TPS 13 is removed and replaced by a high temperature filler material 16 of the wave guide 15 which extends to the surface 18 of the TPS 13. Selection of the filler material 16 depends on the aerothermal environment and flight profile of the vehicle as well as the filler shape. The filler shape is driven by field polarization, bandwidth, filler material, and antenna gain. FIGS. 3A and 3B show two typical shapes that allow the TPS 13 to act as an RF waveguide 15. While the shaped penetration through the TPS 13 is shown in FIG. 4 as being cut straight through, it may also be flared based on considerations of the aerothermal environment, flight dynamics, and ablation characteristics of the TPS 13 and filler material 16. RF energy is coupled into the waveguide 15 via a coupling structure 17 as shown in the FIG. 4. The coupling structure 17 is either directly, capacitively, or inductively coupled to the antenna and feed structure 10, which is integrated into the platform skin 14. The coupling 17 and feed 10 structures, as with any antenna design, are determined by requirements for impedance match, bandwidth, polarization, gain, and power handling.

Figure 5B:
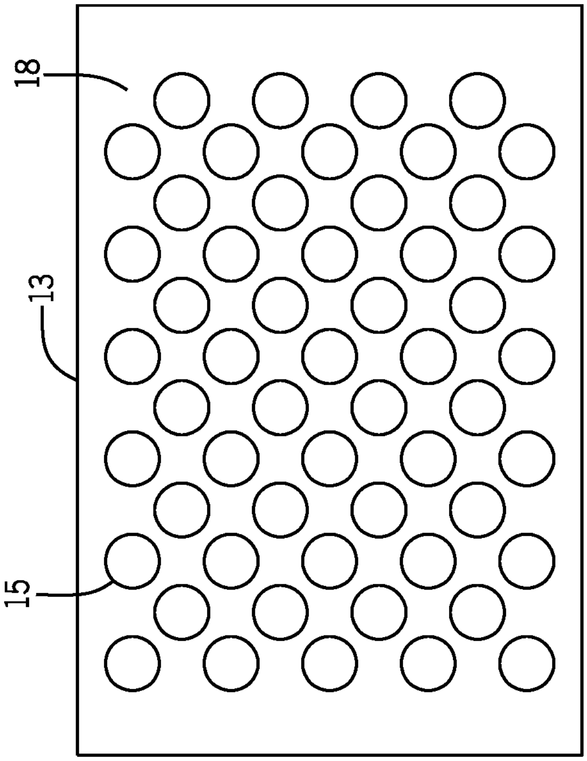
FIG. 5B shows a TPSIA waveguide array geometry having a circular lattice with circular penetrations into a TPS.
Figure 5A:
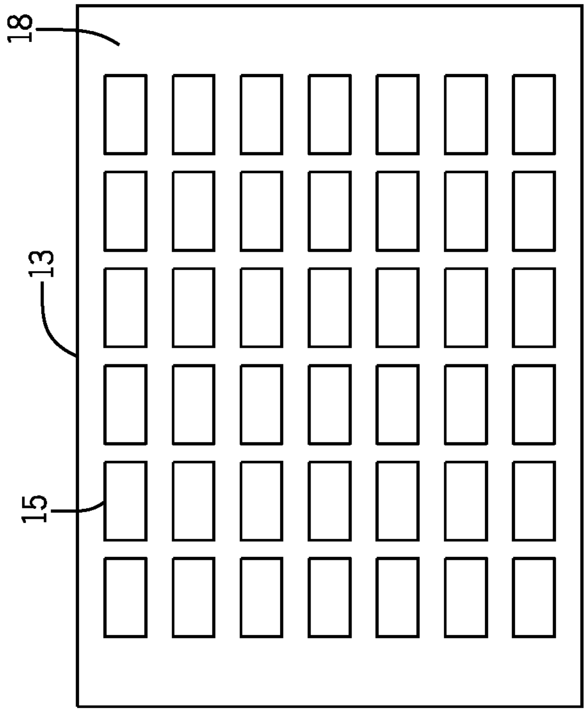
FIG. 5A shows a TPSIA waveguide array geometry having a rectangular lattice with rectangular penetrations into a TPS.

The filler material forms a TPSIA element. In practical use, to control beamwidth, beam steering angle, gain, and power handling, TPSIA elements are typically combined into a phased array with either active or passive steering or a fixed beam. Since the TPSIA element integrates with the platform TPS but otherwise has properties like any other single element, the TPSIA elements may also be combined into an array. FIGS. 5A and 5B show two example geometries using both the rectangular (FIG. 5A) and circular (FIG. 5B) penetrations in rectangular and circular lattices, respectively. The penetration shape does not dictate the lattice shape, so either shape may be used with rectangular, circular, or other array element patterns. Here again, the TPSIA's survivability benefits show forth. For arrays with an electrically large footprint, a typical approach would either restrict the array to an environmentally benign area of the vehicle or require a large window, which is extremely difficult to realize. With the TPSIA, only small penetrations of electromagnetic energy are required, thereby increasing the survivability of the vehicle and manufacturability of the overall vehicle design.

Figure 6:
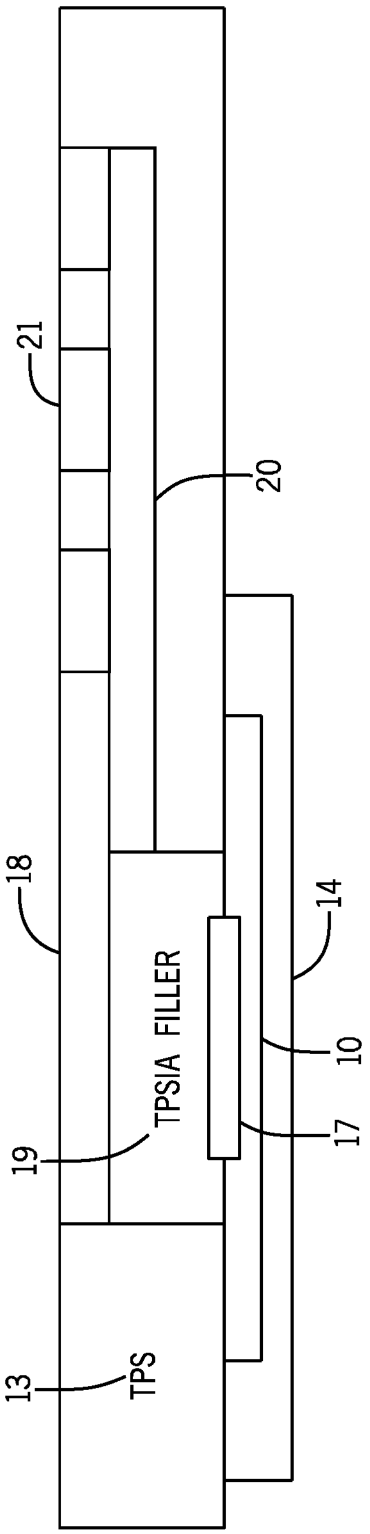
FIG. 6 shows an alternate embodiment of the TPSIA waveguide which forms an internal waveguide path within the TPS.

FIG. 6 shows an alternate embodiment of the TPSIA waveguide 19 having a wave guide which forms an internal waveguide path 20 within the TPS 13. An antenna and coupling feed structure 10 interface with the internal waveguide paths 19 and 20 in the TPS 13 as denoted by the "TPSIA" region 19 and wave guide path region 20. These regions function within the TPS 13 to guide electromagnetic energy to/from the coupling structure 17 to/from one or more apertures or perforations 21 in the surface 18 of TPS 13. Thus, similar to the rectangular/circular apertures in waveguide 15 directly above the coupling structure 17 as shown if FIGS. 5A and 5B, the alternant embodiment allows for internal routing of signals through waveguides 19 and 20 within the TPS 13.

There are numerous advantages of this TPSIA system over current systems using antennas with vehicles having TPSs. The TPSIA eliminates the need to identify antenna window or radome materials that have proper structural and thermal properties such that the window is large enough to admit a standard antenna design. The TPSIA reduces the volume required compared to a traditional antenna approach since standard antennas will almost certainly require spacing between a window and the radiating elements. The TPSIA is tightly coupled to the TPS, and therefore requires less volume compared to a radome. The TPSIA improves survivability of the overall antenna system by improving thermal shielding relative to a traditional design. The TPSIA may be integrated with impedance tuning features (such as an environmentally adaptive antenna) to allow a single element or an entire array to dynamically adjust to harsh, changing environmental conditions.

The foregoing description illustrates and describes the disclosure. Additionally, the disclosure shows and describes only the preferred embodiments but as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A thermal protection system integrated antenna, comprising:

a) a thermal protection system;

b) a wave guide formed in the thermal protection system;

c) a coupling structure; and d) the coupling structure is connected to an antenna and feed structure, wherein an internal waveguide path is constructed to route signals internally within the thermal protection system and through one or more apertures in a surface of the thermal protection system.

2. The thermal protection system integrated antenna of claim 1, wherein the thermal protection system is mounted on a platform skin of a vehicle.

3. The thermal protection system integrated antenna of claim 1, wherein a portion of the thermal protection system is removed and replaced with filler material which has radio frequency transparency.

4. The thermal protection system integrated antenna of claim 1, wherein radio frequency energy is coupled into the wave guide via the coupling structure.

5. The thermal protection system integrated antenna of claim 1, wherein the antenna and feed structure are integrated into a platform skin of a vehicle.

6. The thermal protection system integrated antenna of claim 1, wherein a plurality of wave guides forms a phased array in the platform skin with either active or passive steering or a fixed beam.

7. A thermal protection system integrated antenna, comprising:

a) a thermal protection system wherein the thermal protection system is mounted on a platform skin of a vehicle;

b) a wave guide formed in the thermal protection system wherein a portion of the thermal protection system is removed and replaced with filler material which has radio frequency transparency;

c) a coupling structure wherein radio frequency energy is coupled into the wave guide via the coupling structure; and d) the coupling structure is connected to an antenna and feed structure wherein the antenna and feed structure are integrated into the platform skin, wherein an internal waveguide path is constructed to route signals internally within the thermal protection system and through one or more apertures in a surface of the thermal protection system.

8. The thermal protection system integrated antenna of claim 7, wherein a plurality of wave guides forms a phased array in the platform skin with either active or passive steering or a fixed beam.

9. A thermal protection system integrated antenna, comprising:

a) a thermal protection system;

b) a wave guide formed in the thermal protection system;

c) a coupling structure;

d) the coupling structure is connected to an antenna and feed structure;

e) a plurality of wave guides forms a phased array in a platform skin of a vehicle with either active or passive steering or a fixed beam; and f) an internal waveguide path is constructed to route signals internally within the thermal protection system and through one or more apertures in a surface of the thermal protection system.

10. The thermal protection system integrated antenna of claim 9, wherein the thermal protection system is mounted on the platform skin of the vehicle.

11. The thermal protection system integrated antenna of claim 9, wherein a portion of the thermal protection system is removed and replaced with filler material which has radio frequency transparency.

12. The thermal protection system integrated antenna of claim 9, wherein radio frequency energy is coupled into the wave guide via the coupling structure.

13. The thermal protection system integrated antenna of claim 9, wherein the antenna and feed structure are integrated into the platform skin.

* * * * *